US012800085B2

(12) United States Patent
Hallot et al.

(10) Patent No.: US 12,800,085 B2
(45) Date of Patent: Nov. 17, 2026

(54) PIPE FOR TRANSPORTING FLUIDS WITH CONTROL OF THE BUCKLING OF THE INTERNAL ANTI-CORROSION LINER

(71) Applicant: SAIPEM S.A., Montigny le Bretonneux (FR)

(72) Inventors: Raymond Hallot, Voisins le Bretonneux (FR); Morgan Gouriou, Hermeray (FR); Thomas Delaplace, Clichy (FR)

(73) Assignee: SAIPEM S.A., Montigny le Bretonneux (FR)

( * ) Notice: Subject to any disclaimer, the term of this patent is extended or adjusted under 35 U.S.C. 154(b) by 358 days.

(21) Appl. No.: 18/290,680

(22) PCT Filed: Jun. 21, 2022

(86) PCT No.: PCT/FR2022/051201
§ 371 (c)(1),
(2) Date: Jan. 19, 2024

(87) PCT Pub. No.: WO2023/002101
PCT Pub. Date: Jan. 26, 2023

(65) Prior Publication Data

US 2024/0337346 A1 Oct. 10, 2024

(30) Foreign Application Priority Data

Jul. 22, 2021 (FR) ....................................... 2107956

(51) Int. Cl.
*F16L 57/06* (2006.01)
*F16L 9/147* (2006.01)
*F16L 58/10* (2006.01)

(52) U.S. Cl.
CPC ............... *F16L 57/06* (2013.01); *F16L 9/147* (2013.01); *F16L 58/1009* (2013.01)

(58) Field of Classification Search
CPC ... F16L 58/1009; F16L 58/1036; F16L 57/02; F16L 57/06; F16L 9/147; F16L 9/18;
(Continued)

(56) References Cited

U.S. PATENT DOCUMENTS 6,311,730 B2 * 11/2001 Penza ................. F16L 55/1651 264/269
8,366,351 B2 2/2013 Rocher
2015/0369399 A1 * 12/2015 Fyfe .................... F16L 58/1009 138/97

FOREIGN PATENT DOCUMENTS

CN 104344100 A 2/2015
CN 104455761 A 3/2015
(Continued)

OTHER PUBLICATIONS

French Search Report from corresponding French Patent Application No. FR2107956, Mar. 21, 2022.
(Continued)

*Primary Examiner* — Aaron M Dunwoody
(74) *Attorney, Agent, or Firm* — Workman Nydegger

(57) ABSTRACT

A pipe for transporting fluids with control of the buckling of the internal anti-corrosion liner includes a steel tube intended to receive a flow of fluids to be transported, and an annular protective lining made of polymer material, inserted in an interference fit inside the tube against an inner surface thereof and intended to ensure protection of the steel against corrosion of the fluids to be transported, the protective lining having, in a cross-section plane, at least a weakened angular portion whose mechanical resistance to radial deformation is lower than that of the remaining angular portion of the protective lining so as to control the angular location and to promote the axial propagation of buckling of the protective lining following a depressurization of the pipeline.

13 Claims, 8 Drawing Sheets

(58) Field of Classification Search
CPC ......... F16L 55/00; F16L 55/06; F16L 55/033; F16L 55/0336
USPC .......................................... 138/111, 115, 110
See application file for complete search history.

(56) References Cited

FOREIGN PATENT DOCUMENTS

| | | | |
|---|---|---|---|
| CN | 107906301 | A | 4/2018 |
| DE | 19615935 | A1 | 10/1997 |
| FR | 2906339 | A1 | 3/2008 |
| GB | 2561197 | A | 10/2018 |
| WO | 1998012465 | A1 | 3/1998 |
| WO | 2000060273 | A1 | 10/2000 |

OTHER PUBLICATIONS

International Search Report from corresponding PCT Application No. PCT/FR2022/051201, Sep. 26, 2022.
Australian Office Action from Corresponding Australian Patent Application No. AU2022315002, Feb. 24, 2025.

* cited by examiner

PIPE FOR TRANSPORTING FLUIDS WITH CONTROL OF THE BUCKLING OF THE INTERNAL ANTI-CORROSION LINER

TECHNICAL FIELD

The present invention relates to the general field of steel pipelines used for the transport of corrosive fluids. It more particularly concerns subsea or land steel pipelines for the transport of hydrocarbons, particularly oil and gas.

PRIOR ART

Subsea pipelines used for the transport of hydrocarbons particularly oil and gas, derived from subsea production wells, are generally made of a steel tube.

It has been observed that the transported fluids are corrosive to the steel making up the tubes. Also, to protect them against corrosion, it is known to insert or apply inside the steel pipeline a layer of corrosion-resistant steel—typically having a thickness of the oder of 3 mm—(this technique is called CRA cladding for Corrosion Resistance Alloy cladding).

Alternatively, this solution can be replaced by the insertion of an annular protective lining—typically having a thickness of the oder of 10 mm—made of polymer material, for example thermoplastic material. The protective lining is typically inserted by pulling inside the steel tube and presses against the inner surface of the tube once the pulling force is released to obtain an interference fit. This technique is quite commonly used for liquid transport pipelines such as injection water but less widespread for multi-phase production fluid transport lines.

Although more economical than the usual technique known as CRA cladding, the lining made of polymer material has the disadvantage of being permeable to gases and vapors coming from the transported fluids. Also, in practice, gas tends to penetrate through the protective lining to be housed in the interstitial space between the lining and the inner wall of the steel tube.

Over time, gases and vapors will accumulate in the interstitial space and thus create an accumulation of pressurized gas, more or less uniformly distributed over the length of the pipeline. However, when the pipeline is going to be depressurized, the permeation rate of the protective lining is not high enough to reduce the pressure inside the interstitial space at the same speed as the pressure drop inside the pipeline. A pressure differential is then created with an overpressurization on the side of the interstitial space, with a risk of appearance of local buckling or collapse of the protective lining.

The local and uncontrolled collapse of the protective lining during depressurization of the pipeline may have the consequence of compromising the integrity of the protective lining and therefore its effectiveness as protection against corrosion of the steel constituting the tube. In addition, when the pipeline is repressurized, there is a risk that the part of the protective lining that has collapsed will not be able to return to its initial shape against the inner wall of the tube.

Several solutions have been envisaged to resolve this problem of uncontrolled collapse of the protective lining during depressurization of the pipeline. Some intend to apply an adhesive coating to the inner surface of the steel tube to limit the volume of gas that can pass through the protective lining. Other known solutions consist in forming grooves on the outer face of the lining so as to collect the gases that have passed through the lining and to discharge them to the outside of the pipeline via outer orifices made in the tube. This degassing operation can be carried out continuously or at regular intervals.

Yet another solution consists in making perforations in the protective lining so as to put the interstitial space into contact with the inside of the lining. In case of depressurization of the pipeline, the gases having passed through the lining will use these perforations in order to be discharged from the inside of the lining so as to keep the pressure differential below the collapse pressure of the lining.

All the solutions of the prior art presented above have disadvantages. Particularly, the use of an adhesive coating on the inner surface of the steel tube has the disadvantage of a significant complexity of the implementation process which requires several phases of application of different layers followed by baking phases to create the adhesion. Furthermore, the use of outer gas discharge orifices requires drilling the steel tube, which weakens the integrity of the tube, and providing a gas discharge line in the subsea environment, which increases the risks of leakage. In addition, this solution requires maintenance operations to activate the degassing operation. The grooves made on the outer surface of the liner are also subject to clogging and to accumulation of liquid which can reduce the effectiveness of the ventilation, just as they increase the volume of gas that can accumulate under the lining and therefore the potential energy reserve that can lead to collapse.

Likewise, the solution consisting in making perforations in the protective lining has the disadvantage of putting the transported fluids into contact with the steel tube, with the risk of locally causing corrosion.

DISCLOSURE OF THE INVENTION

The present invention aims to propose a pipeline for the transport of fluids making it possible to control the collapse of a protective lining during depressurization of the pipeline which does not present the aforementioned disadvantages.

By control of the collapse, it is meant here that the invention makes it possible to control the location and the amplitude of the buckling of the protective lining during a pipeline depressurization operation.

This aim is achieved thanks to a pipeline for the transport of fluids comprising a steel tube intended to receive a flow of fluids to be transported, and an annular protective lining made of polymer material, inserted in an interference fit inside the tube against an inner surface thereof and intended to ensure protection of the steel against corrosion of the fluids to be transported, and in which, in accordance with the invention, the protective lining has, in a cross-sectional plane, at most two weakened angular portions whose mechanical resistance to radial deformation is lower than that of the remaining angular portion of the protective lining so as to control the angular location and promote the axial propagation of buckling of the protective lining following a depressurization of the pipeline.

By “interference fit”, it is meant that the protective lining has an outer diameter which is slightly greater than the inner diameter of the tube inside which it is inserted. Thus, the outer surface of the protective lining is in continuous contact with the inner surface of the tube over the entire circumference of the latter (no interstitial space remains between the protective lining and the tube).

The present invention is remarkable in particular in that it does not seek to avoid, during a pipeline depressurization operation, any collapse (or buckling) of the protective lining, but to control on the one hand its location and on the other hand its amplitude by limiting it as much as possible. Indeed, the fact of providing angular portions of the protective lining which have a weakened mechanical resistance to the radial deformation compared to the rest of the lining makes it possible to fix the areas in which the protective lining will buckle during depressurization of the pipeline. It is thus possible to best distribute the angular location and axial propagation of buckling of the protective lining.

The invention is also remarkable in that the control of the buckling does not require any outer orifice of discharge on the tube or of perforation in the protective lining. The integrity of the tube and of the protective lining are thus preserved and any risk of leakage can be eliminated.

The invention is further remarkable in that it can be used with different types of polymer material to make the protective lining, in offshore or onshore applications and be combined with different types of lining termination.

The invention is still remarkable because of the interference fit between the protective lining and the tube which makes it possible to minimize the volume of gas that could accumulate between these two pieces.

Preferably, each weakened angular portion of the protective lining extends over an angle of at least 50°.

In a first embodiment, the protective lining has, in a cross-sectional plane, a variation in thickness over its entire circumference.

In this first embodiment, the variation in thickness of the protective lining can be obtained by inserting a protective lining of variable thickness inside the steel tube with an offset of the respective longitudinal axes of the inner surface and of the outer surface of the protective lining.

In a second embodiment, the protective lining has, in a cross-sectional plane, a substantially circular outer surface and an inner surface with an oval shape so as to form two diametrically opposite weakened angular portions which each have a thickness smaller than that of the remaining angular portion of the protective lining.

In a third embodiment, the protective lining has, in a cross-sectional plane, a substantially circular outer surface and an inner surface with a recess forming the weakened angular portion which has a thickness smaller than that of the remaining angular portion of the protective lining.

In a forth embodiment, the protective lining has, in a cross-sectional plane, an angular portion composed of two different materials having different mechanical properties so as to form the weakened angular portion of the protective lining.

In a fifth embodiment, the protective lining has, before its insertion into the tube, in a cross-sectional plane, an outer surface with an oval shape and a substantially circular inner surface so as to form after its insertion into the tube two diametrically opposite weakened angular portions.

The protective lining can comprise a spar which is angularly located at the level of a weakened angular portion and which extends longitudinally along the longitudinal axis of the tube so as to axially stiffen the protective lining and to increase the axial propagation of the buckling of the protective lining following a depressurization of the pipeline.

The spar can be located at the level of the inner surface of the protective lining. Alternatively, it can be integrated inside the protective lining.

Also preferably, the inner surface of the steel tube comprises a surface treatment to reduce the surface roughness prior to the insertion of the protective lining, which improves the contact fit between the protective lining and the tube.

In this case, the boss of the steel tube can be made by a steel weld bead or by a rigid rod welded or bonded to the inner surface of the tube.

The tube can be made of carbon steel and the protective lining can be made of thermoplastic material or of thermosetting material or of thermoplastic material with fiber reinforcement.

DESCRIPTION OF THE EMBODIMENTS

The invention relates to any type of pipeline for the transport of corrosive fluids, in particular hydrocarbons, comprising a steel tube inside which the fluids to be transported flow, and an annular protective lining made of polymer material, inserted inside the tube in an interference fit against an inner surface thereof and intended to ensure protection of the steel against the corrosion of the fluids to be transported.

The invention finds a preferred (but non-limiting) application to the subsea transport of hydrocarbons, particularly oil and gas, derived from subsea production wells.

Figure 1A:
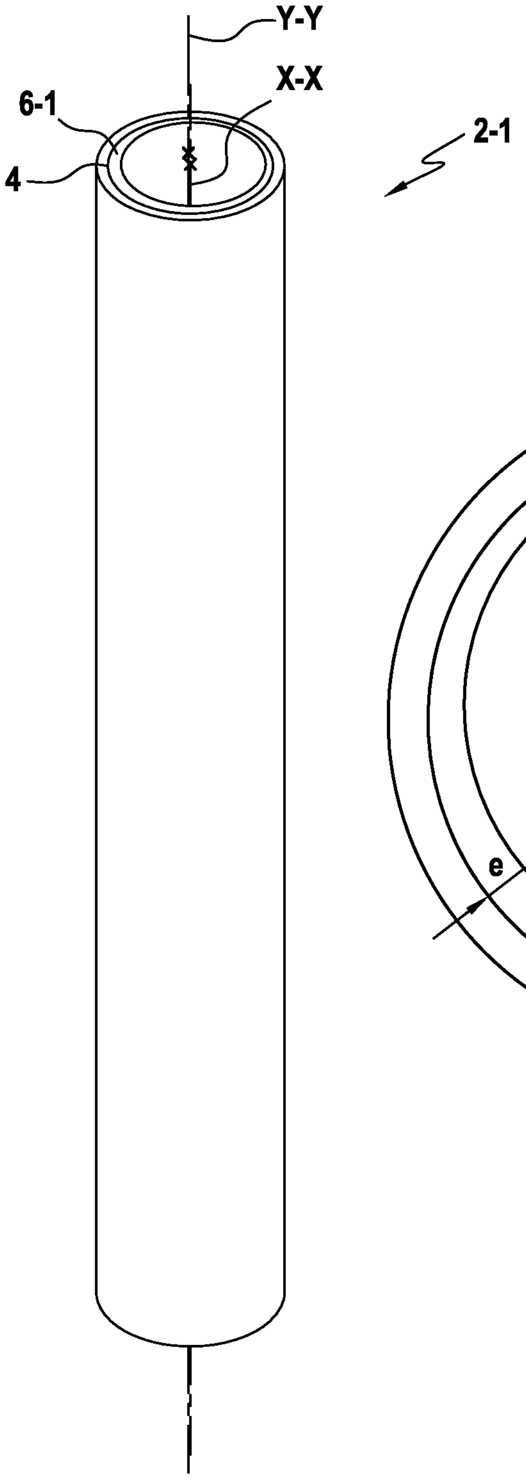
FIGS. 1A and 1B represent a fluid transport pipeline according to a first embodiment of the invention, respectively in perspective and in section along a transverse plane.
Figure 1B:
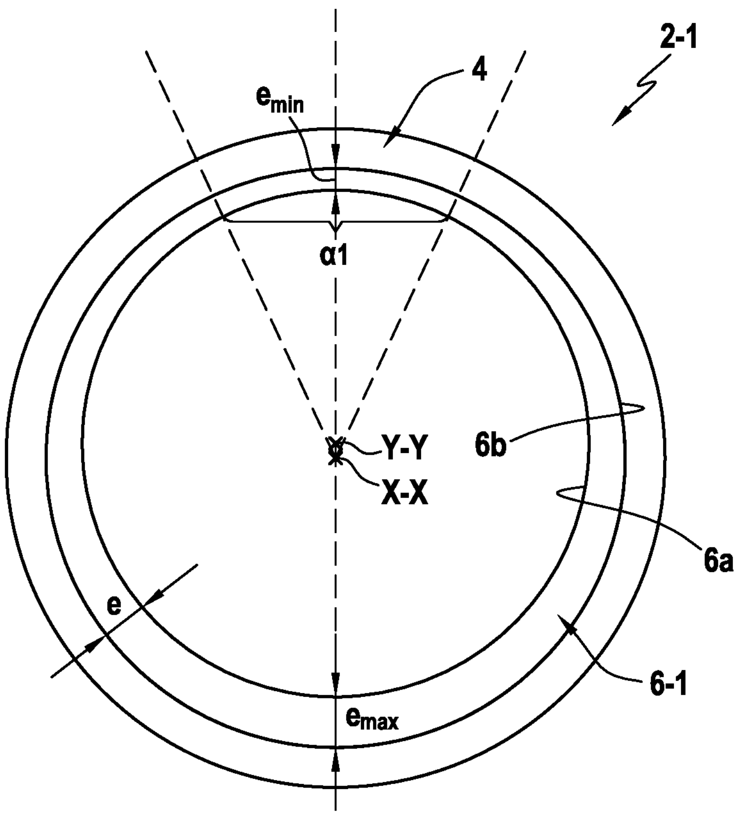

FIGS. 1A and 1B show, respectively in perspective and in section along a transverse plane, a pipeline portion 2-1 according to a first embodiment of the invention.

The pipeline 2-1 comprises a steel tube 4, for example carbon steel, having a longitudinal axis X-X and intended to receive the flow of fluids to be transported. The pipeline also comprises an annular protective lining 6-1 which is made of polymer material, inserted inside the tube 4 against an inner surface thereof and intended to ensure protection of the steel against corrosion of the fluids to be transported.

The protective lining 6-1 can be made of thermoplastic material (for example high-density polyethylene (PE-HD), polypropylene, polyamide, polyvinylidene fluoride or polyphenylene etheretherketone) or of thermosetting material or of thermoplastic material with fiber reinforcement.

In the first embodiment of FIGS. 1A and 1B, the protective lining 6-1 has, in a cross-sectional plane (see FIG. 1B), a variation in thickness e over its entire circumference.

In other words, the thickness e of the protective lining varies continuously between a minimum $e_{min}$ and a maximum $e_{max}$. It is noted that the thicknesses $e_{min}$ and $e_{max}$ are diametrically opposite and preferably the minimum thickness $e_{min}$ is positioned "at twelve o'clock".

This variation in thickness e of the protective lining 6-1 is obtained by inserting a protective lining of variable thickness inside the steel tube 4, the outer surface 6*b* of the lining having a longitudinal axis coincident with the longitudinal axis X-X of the tube 4, and the inner surface 6*a* of the lining having a longitudinal axis Y-Y which is offset relative to the longitudinal axis X-X (that is to say it is not coincident therewith but parallel thereto). In other words, a concentricity deviation is introduced between the inner and outer surfaces of the protective lining 6-1.

Thus, the protective lining 6-1 has a weakened angular portion α1 (centered on the minimum thickness $e_{min}$) whose mechanical resistance to radial deformation is lower than that of the remaining angular portion of the protective lining.

Figure 2A:
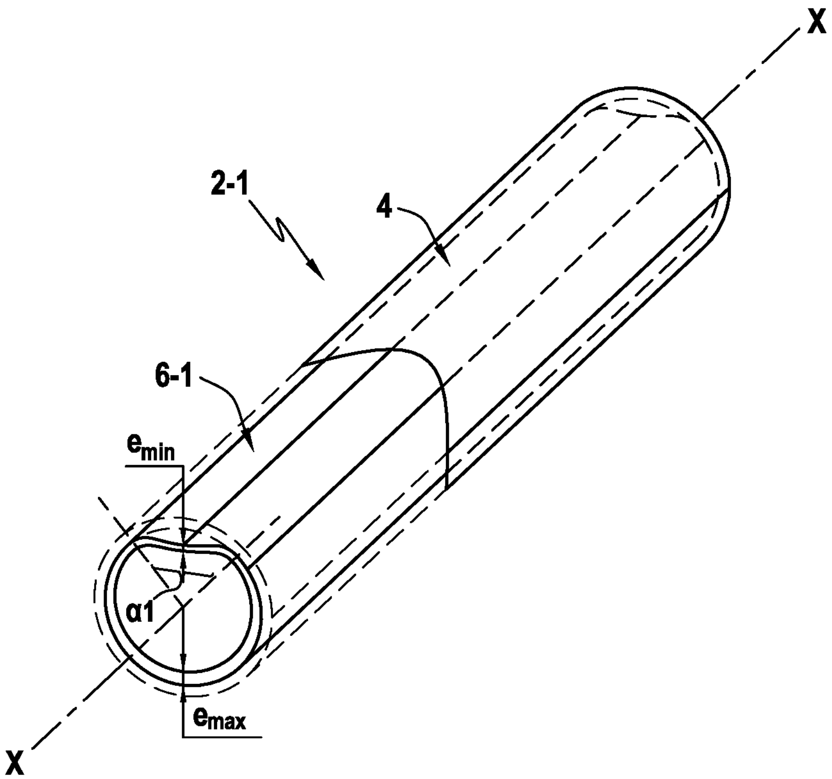
FIGS. 2A and 2B show in perspective and in section along a transverse plane an example of buckling of the protective lining of the pipeline in FIGS. 1A and 1B.
Figure 2B:
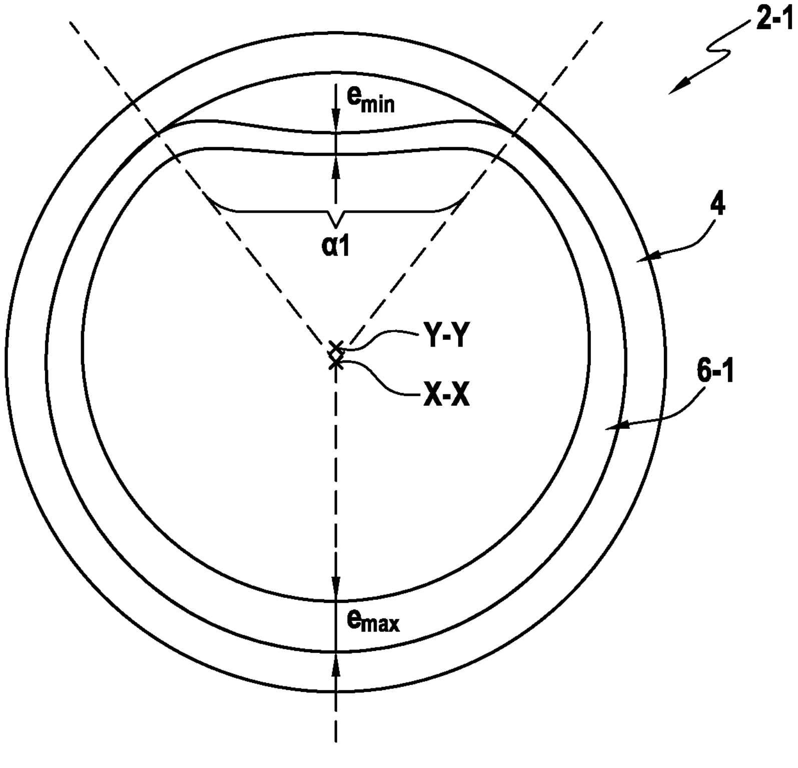

As represented in FIGS. 2A and 2B, this weakened angular portion α1 makes it possible to control the angular location of buckling or collapse of the protective lining following a depressurization of the pipeline while facilitating its axial propagation, and thereby by limiting its amplitude.

Indeed, in the event of a depressurization operation on the pipeline 2-1, it was observed that it is the weakened angular portion α1 of the protective lining 6-1 that undergoes buckling (or collapse) towards the inside of the pipeline, this buckling angularly extending only on the weakened portion α1 located "at twelve o'clock", and having an amplitude which is limited (in the radial direction), and which extends longitudinally over the entire length of the pipeline 2-1 (see FIG. 2A).

It was also observed that following the depressurization operation, when the pipeline 2-1 is put into service again (and therefore pressurized), the protective lining 6-1 which has undergone a controlled buckling returns to its initial shape (that is to say the weakened angular portion which has collapsed presses again against the inner surface of the tube 4).

It will be noted that during the assembly of the pipes to construct the protective lining 6-1 with the butt fusion welding operations, the pipes must be assembled to ensure axial continuity of the thickness variation, that is to say, the pipe sections must be properly aligned from one pipe to another to construct a seamless protective lining. This could be done by using external color marks/stripes which are common in the pipe industry. This assembly method using color marks is also applicable to the other embodiments of the invention described below.

It will also be noted that the outer diameter of the lining as well as its installation inside the tube are designed and dimensioned to achieve an interference fit as much as possible in order to minimize the volume potentially available under the lining for the permeation gas, therefore limiting the potential energy that could lead to collapse.

This first embodiment has the advantage that the passage inside the protective lining 6-1 remains cylindrical in shape over the entire length of the pipeline 2-1, which allows normal use of the cleaning elements of the pipeline (such as scrapers).

Figure 3A:
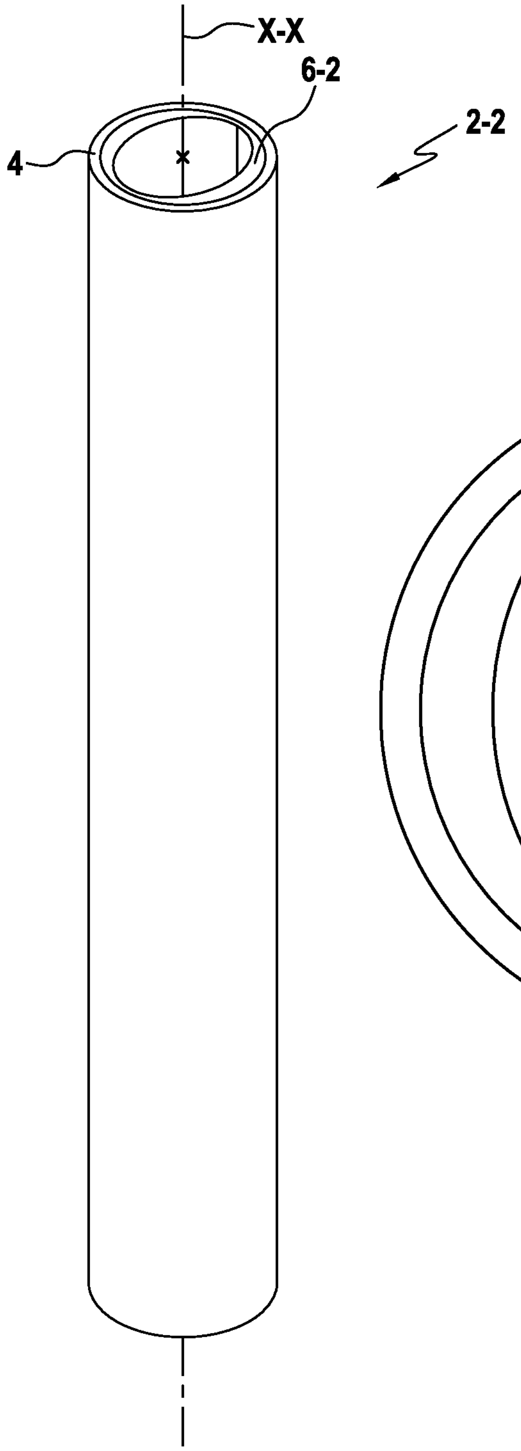
FIGS. 3A and 3B represent a fluid transport pipeline according to a second embodiment of the invention, respectively in perspective and in section along a transverse plane.
Figure 3B:
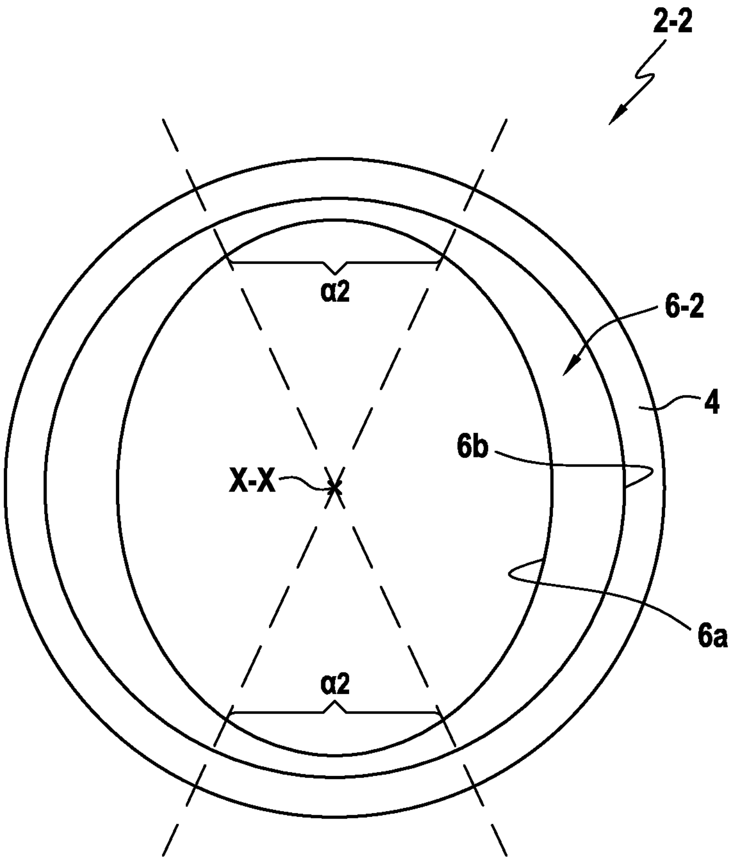

FIGS. 3A and 3B show a pipeline portion 2-2 according to a second embodiment of the invention.

This second embodiment differs from the previous one in that the protective lining 6-2 presents, in a cross-sectional plane (see FIG. 3B), an outer surface 6*b* which is substantially circular and an inner surface 6*a* having an oval shape.

Thus, the protective lining 6-2 has two diametrically opposite weakened angular portions α2 (and preferably positioned "at twelve o'clock" and "at six o'clock") which each have a thickness smaller than that of the remaining angular portion of the protective lining.

These two weakened angular portions α2 have a mechanical resistance to radial deformation which is lower than that of the remaining angular portion of the protective lining.

In practice, it has been observed that with such a geometry of the protective lining 6-2, in the event of a depressurization operation on the pipeline 2-2, it is the two weakened angular portions α2 of the protective lining that undergo buckling towards the inside of the pipeline, these bucklings angularly extending only on the weakened portions α2 located "at twelve o'clock" and "at six o'clock", and having an amplitude which is limited (in the radial direction) and which extends longitudinally over the entire length of the pipeline 2-2.

During depressurization of the pipeline, the buckling can thus begin on both sides of the weakened angular portions α2 before one side becomes more unstable than the other if the buckling becomes significant. For low depressurizations (flow rate variations for example), this solution has the advantage of dividing the expansion of the gases on two fronts instead of one, further limiting the buckling (because the gases will expand over two volumes). The distribution of the stresses in the protective lining in an interference fit will also help achieve the desired instabilities. This will also help during the re-pressurization of the pipeline.

Figure 4A:
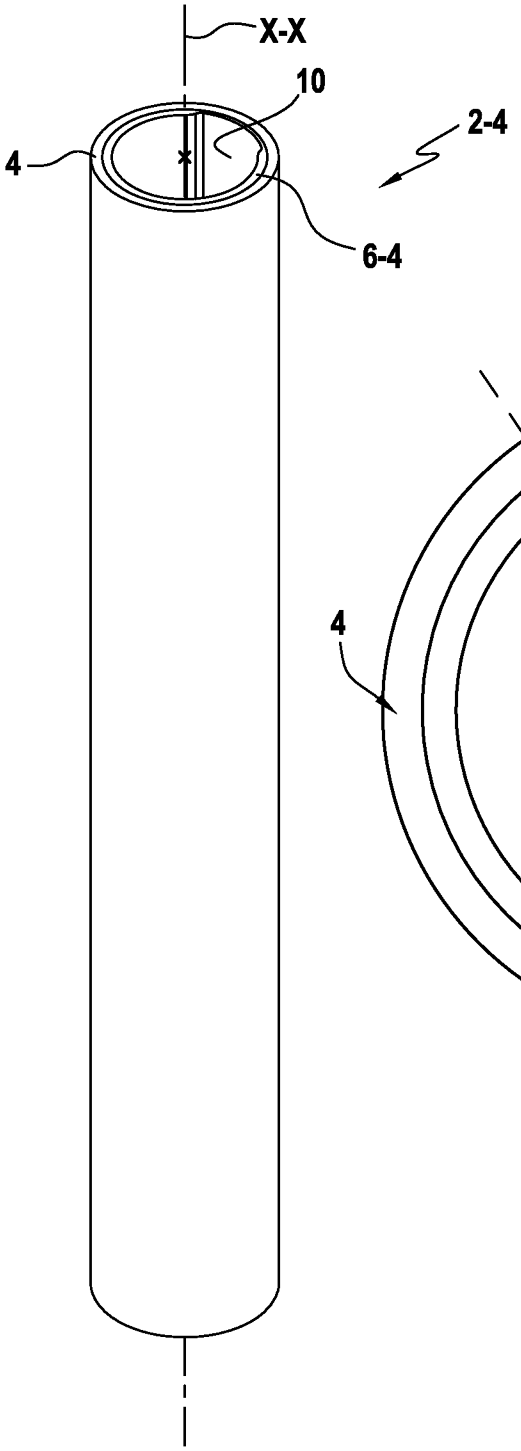
FIGS. 4A and 4B represent a fluid transport pipeline according to a third embodiment of the invention, respectively in perspective and in section along a transverse plane.
Figure 4B:
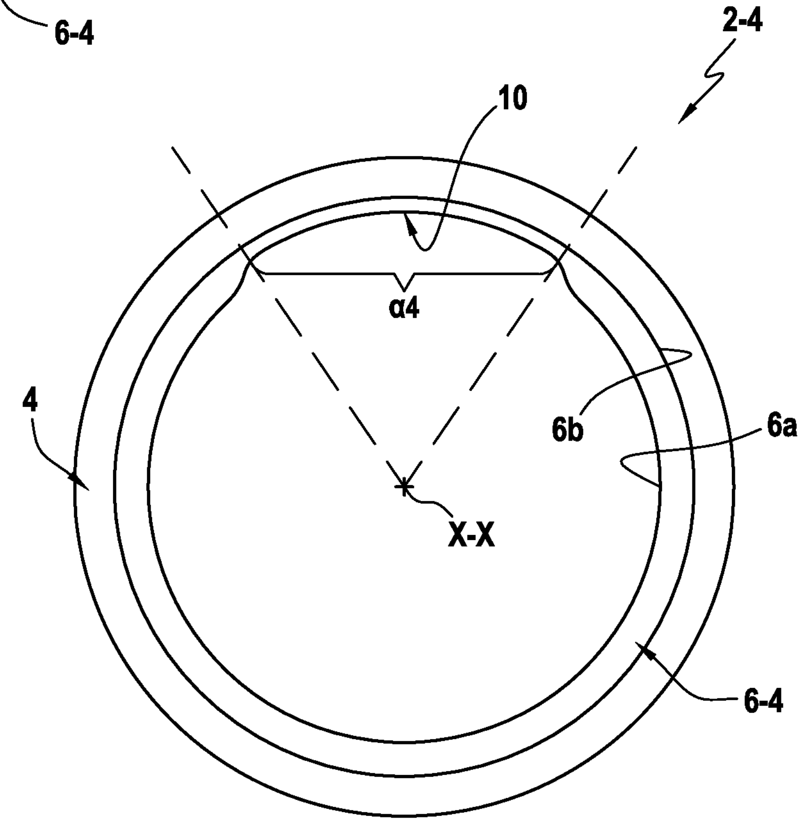

FIGS. 4A and 4B show a pipeline portion 2-4 according to a third embodiment of the invention.

This third embodiment differs from the previous ones in that the protective lining 6-4 has, in a cross-sectional plane (see FIG. 4B), an outer surface 6*b* which is substantially circular and an inner surface 6*a* with a recess (or step) 10 located angularly preferably "at twelve o'clock".

The recess 10 of the protective lining 6-4 thus forms a weakened angular portion α4 which has a thickness smaller than that of the remaining angular portion of the protective lining. Here, the thickness of the weakened angular portion α4 is constant.

This weakened angular portion α4 has a mechanical resistance to radial deformation which is lower than that of the remaining angular portion of the protective lining.

In practice, it has been observed that with such a geometry of the protective lining 6-4, in the event of a depressurization operation on the pipeline 2-4, it is the only weakened angular portion α4 of the protective lining that undergoes buckling towards the inside of the pipeline, this buckling angularly extending only on the weakened portion α4, and having an amplitude which is limited (in the radial direction) and which extends longitudinally over the entire length of the pipeline 2-4.

Figure 5A:
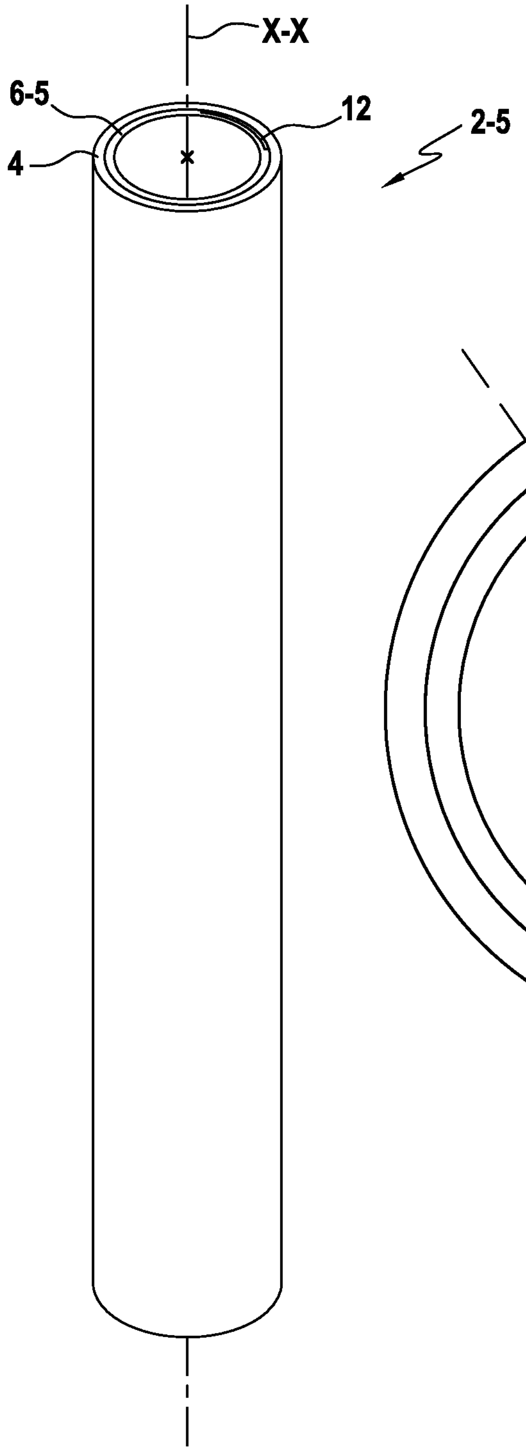
FIGS. 5A and 5B represent a fluid transport pipeline according to a fourth embodiment of the invention, respectively in perspective and in section along a transverse plane.
Figure 5B:
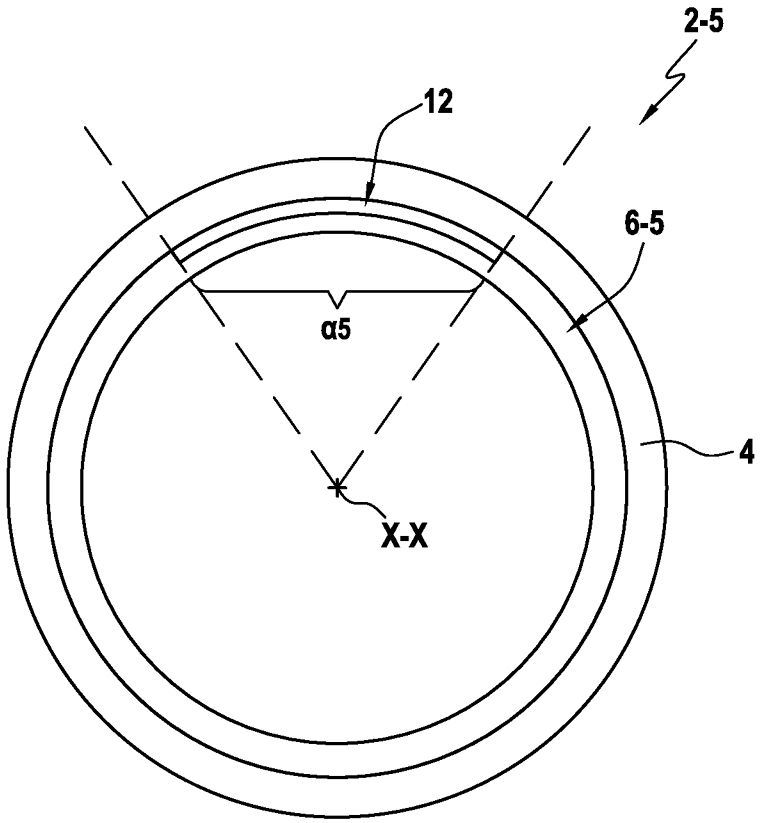

FIGS. 5A and 5B show a pipeline portion 2-5 according to a fifth embodiment of the invention.

This forth embodiment has the particularity that the protective lining 6-5 has, in a cross-sectional plane (see FIG. 5B), an angular portion which is composed of two different materials having different mechanical properties so as to form the weakened angular portion α5 of the protective lining.

For example, the weakened angular portion α5 could be composed of two different thermoplastic materials with one or several inserts 12 made in a thermoplastic material less rigid than the thermoplastic material used for the rest of the protective lining.

This weakened angular portion $\alpha$5 thus has a mechanical resistance to radial deformation which is lower than that of the remaining angular portion of the protective lining.

In this embodiment, the protective lining 6-5 can thus have an inner surface 6*a* and an outer surface 6*b* which are, in a cross-sectional plane, of substantially circular shape.

In practice, it has been observed that with such a geometry of the protective lining 6-5, in the event of a depressurization operation on the pipeline 2-5, it is the only weakened angular portion $\alpha$5 of the protective lining that undergoes buckling towards the inside of the pipeline, this buckling angularly extending only on the weakened portion, and having an amplitude which is limited (in the radial direction) and which extends longitudinally over the entire length of the pipeline 2-5.

Figure 6A:
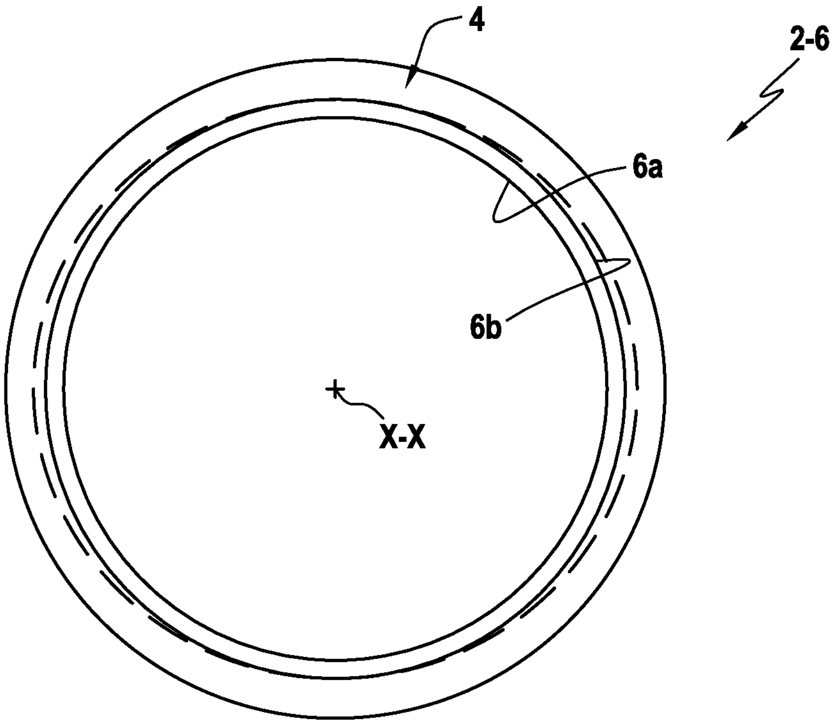
FIGS. 6A and 6B represent a fluid transport pipeline according to a fifth embodiment of the invention, respectively in perspective and in section along a transverse plane.
Figure 6B:
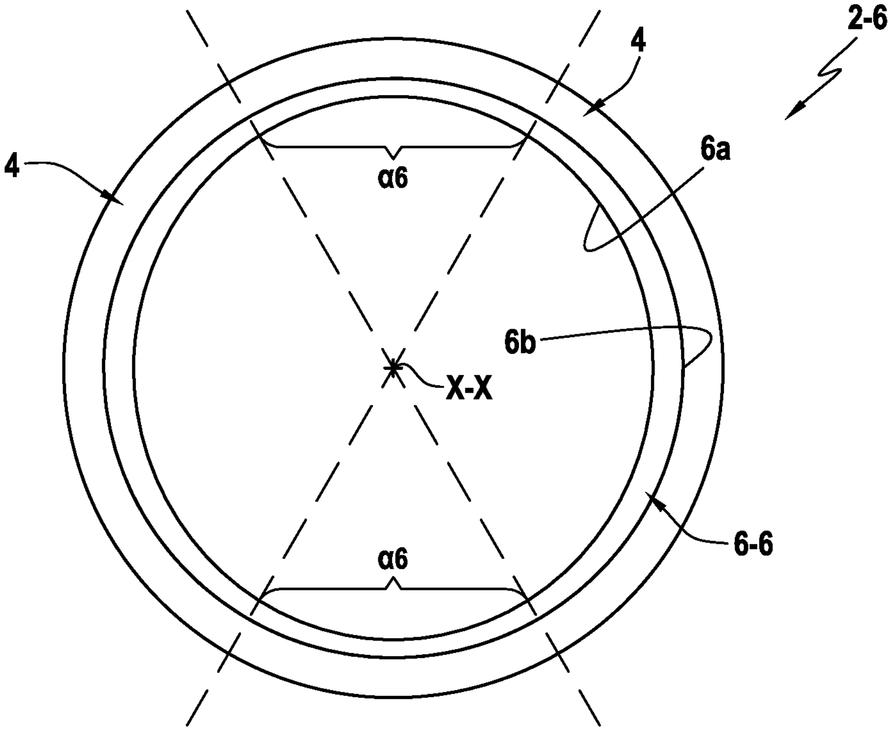

FIGS. 6A and 6B show a pipeline portion 2-6 according to a sixth embodiment of the invention, respectively before and after insertion of the protective lining inside the tube of the pipeline.

In this forth embodiment, the protective lining 6-6 has, before its insertion into the tube (FIG. 6A), in a cross-sectional plane, an outer surface 6*b* which has an oval shape and an inner surface 6*a* which is substantially circular.

Thus, once the protective lining 6-6 is inserted inside the tube 4, the latter will press against the inner wall of the tube so as to form two weakened angular portions $\alpha$6 which are diametrically opposite (and which are preferably positioned "at twelve o'clock" and "at six o'clock").

More specifically, these two weakened angular portions $\alpha$6 have, after insertion of the protective lining into the tube, thicknesses smaller than the thickness of the remaining angular portion of the protective lining.

These two weakened angular portions $\alpha$6 thus have a mechanical resistance to radial deformation which is lower than that of the remaining angular portion of the protective lining.

With such a geometry of the protective lining 6-6, it has been observed in practice that in the event of a depressurization operation on the pipeline 2-6, it is the two weakened angular portions $\alpha$6 of the protective lining that undergo buckling towards the inside of the pipeline, these bucklings angularly extending only on the weakened portions $\alpha$6 located "at twelve o'clock" and "at six o'clock", and having an amplitude which is limited (in the radial direction) and which extends longitudinally over the entire length of the pipeline 2-6.

In the same way as for the previous embodiments, during the depressurization of the pipeline, the buckling will begin on both sides of the weakened angular portions $\alpha$6 before one side becomes more unstable than the other if the buckling becomes significant.

In order to have an interference fit after insertion of the protective lining 6-6, the minimum outer diameter of the lining before its insertion is larger than the inner diameter of the tube. Thus, once the insertion is carried out, the entire outer surface of the protective lining will be in contact with the steel tube. The geometric shape with the thickness variation and the distribution of the internal stresses after insertion will promote the buckling in the desired areas ("at twelve o'clock" and "at six o'clock") and the axial distribution of the buckling.

In relation to FIGS. 7A, 7B, and 8, advantageous characteristics of the invention will now be described. These characteristics apply to all of the embodiments described previously. As an example, they are detailed below in relation to the first embodiment (FIGS. 1A and 1B).

Figure 7A:
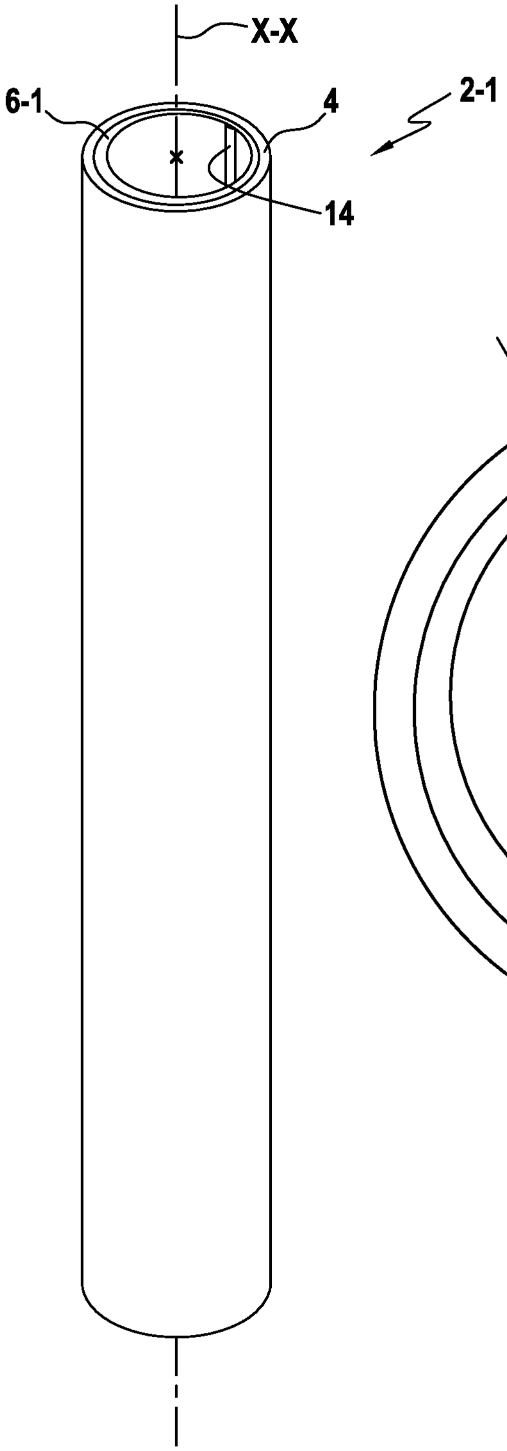
FIGS. 7A and 7B represent, respectively in perspective and in section along a transverse plane, a fluid transport pipeline according to the first embodiment of the invention provided with a spar.
Figure 7B:
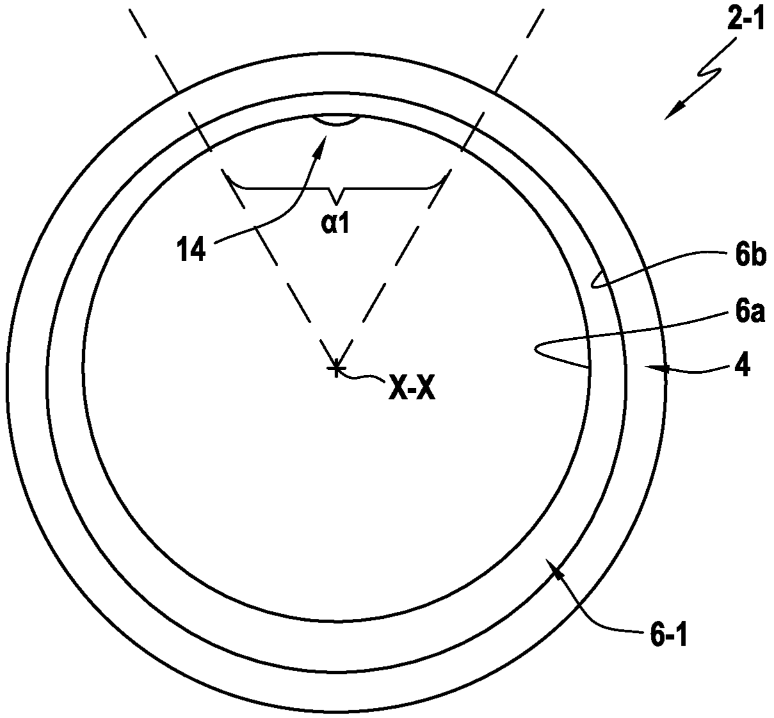

FIGS. 7A and 7B represent a pipeline 2-1 according to the first embodiment of the invention provided with a spar 14 (or axial stiffener) which is angularly located at the level of the weakened angular portion $\alpha$1 of the protective lining 6-1 and which extends longitudinally along the longitudinal axis X-X of the tube.

The presence of such a spar 14 makes it possible to axially stiffen the protective lining 6-1 and to increase the axial propagation of its lining following a depressurization operation on the pipeline 2-1.

In the variant embodiment of FIGS. 7A and 7B, the spar 14 is located at the level of the inner surface 6*a* of the protective lining 6-1.

Figure 8:
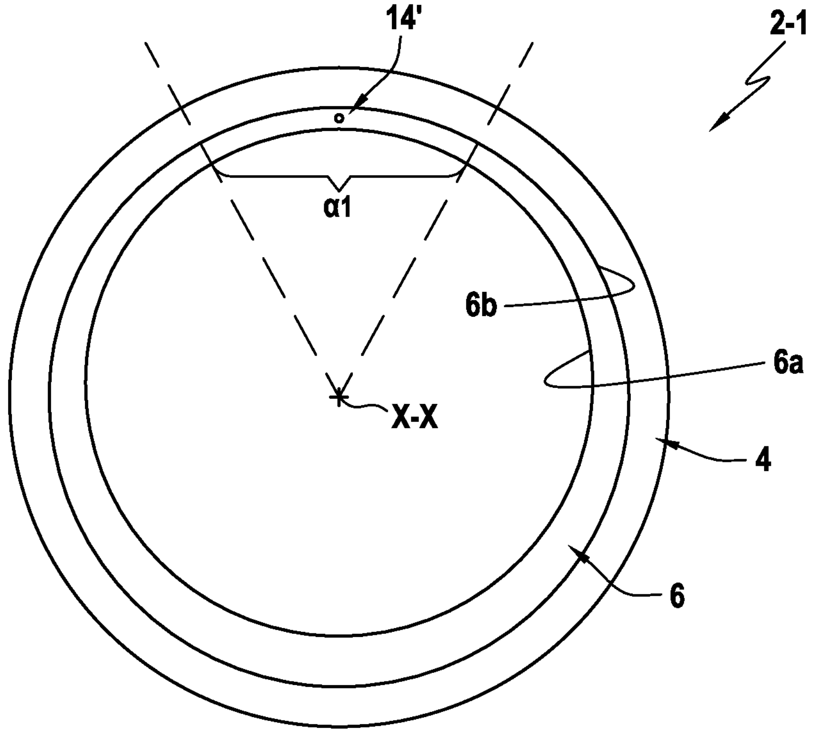
FIG. 8 represents in section along a transverse plane a pipeline according to the first embodiment of the invention provided with a spar according to a variant embodiment of the latter.

In another variant embodiment represented in FIG. 8, the spar 14' is directly integrated inside the protective lining 6-1 (still at the level of its weakened angular portion $\alpha$1).

It will be noted that whatever the embodiment for the weakened angular portion(s), each of them extends over an angle of at least 50°.

It will also be noted that whatever the embodiment, the inner surface of the steel tube is advantageously surface treated to reduce the surface roughness prior to the insertion of the protective lining.

This surface treatment can be a sandblasting of the inner surface of the tube or the application of a paint or coating thereon. It further reduces the maximum amount of gas passing through the protective lining and accumulating under the lining.

The invention claimed is:

1. A pipeline for transport of fluids, the pipeline comprising:

- a steel tube configured to receive a flow of fluids to be transported, and
- an annular protective lining made of polymer material, the protective lining being inserted in an interference fit inside the steel tube against an inner surface of the steel tube, and an outer diameter of the protective lining being slightly greater than an inner diameter of the steel tube prior to insertion of the protective lining inside the steel tube,
- wherein the interference fit provides continuous contact between the inner surface of the steel tube and an outer surface of the protective lining over an entire circumference of the steel tube, the continuous contact minimizing accumulation of gas between the steel tube and the protective lining,
- wherein the protective lining is configured to ensure protection of the steel against corrosion of the fluids to be transported,
- wherein the protective lining has, in a cross-section plane, at most two weakened angular portions whose mechanical resistance to radial deformation is lower than that of a remaining angular portion of the protective lining so as to control angular location and to promote axial propagation of buckling of the protective lining following a depressurization of the pipeline.

2. The pipeline according to claim 1, wherein each weakened angular portion of the protective lining extends over an angle of at least 50°.

3. The pipeline according to claim 1, wherein the protective lining has, in a cross-sectional plane, a variation in thickness over an entire circumference of the protective lining.

4. The pipeline according to claim 3, wherein the variation in thickness of the protective lining is obtained by inserting a protective lining of variable thickness inside the steel tube with an offset of respective longitudinal axes of the inner surface and the outer surface of the protective lining.

5. The pipeline according to claim 1, wherein the protective lining has, in a cross-sectional plane, a substantially circular outer surface and an inner surface with an oval shape so as to form two diametrically opposite weakened angular portions which each have a thickness smaller than that of the remaining angular portion of the protective lining.

6. The pipeline according to claim 1, wherein the protective lining has, in a cross-sectional plane, a substantially circular outer surface and an inner surface with a recess forming the weakened angular portion which has a thickness smaller than that of the remaining angular portion of the protective lining.

7. The pipeline according to claim 1, wherein the protective lining has, in a cross-sectional plane, an angular portion composed of two different materials having different mechanical properties so as to form the weakened angular portion of the protective lining.

8. The pipeline according to claim 1, wherein the protective lining has, before insertion into the steel tube, in a cross-sectional plane, an outer surface with an oval shape and a substantially circular inner surface so as to form, after insertion into the steel tube, two diametrically opposite weakened angular portions.

9. The pipeline according to claim 1, wherein the protective lining comprises a spar which is angularly located at a level of a weakened angular portion and which extends longitudinally along a longitudinal axis of the steel tube so as to axially stiffen the protective lining and to increase the axial propagation of the buckling of the protective lining following a depressurization of the pipeline.

10. The pipeline according to claim 9, wherein the spar is located at the level of the inner surface of the protective lining.

11. The pipeline according to claim 9, wherein the spar is integrated inside the protective lining.

12. The pipeline according to claim 1, wherein the inner surface of the steel tube comprises a surface treatment to reduce surface roughness prior to the insertion of the protective lining.

13. The pipeline according to claim 1, wherein the tube is made of carbon steel and the protective lining is made of thermoplastic material or of thermosetting material or of thermoplastic material with fiber reinforcement.

* * * * *